June 2, 1953  J. KRUITHOF  2,640,884
ELECTRIC MULTISWITCH

Filed March 11, 1948  8 Sheets-Sheet 1

INVENTOR.
JAKOB KRUITHOF
BY
ATTORNEY

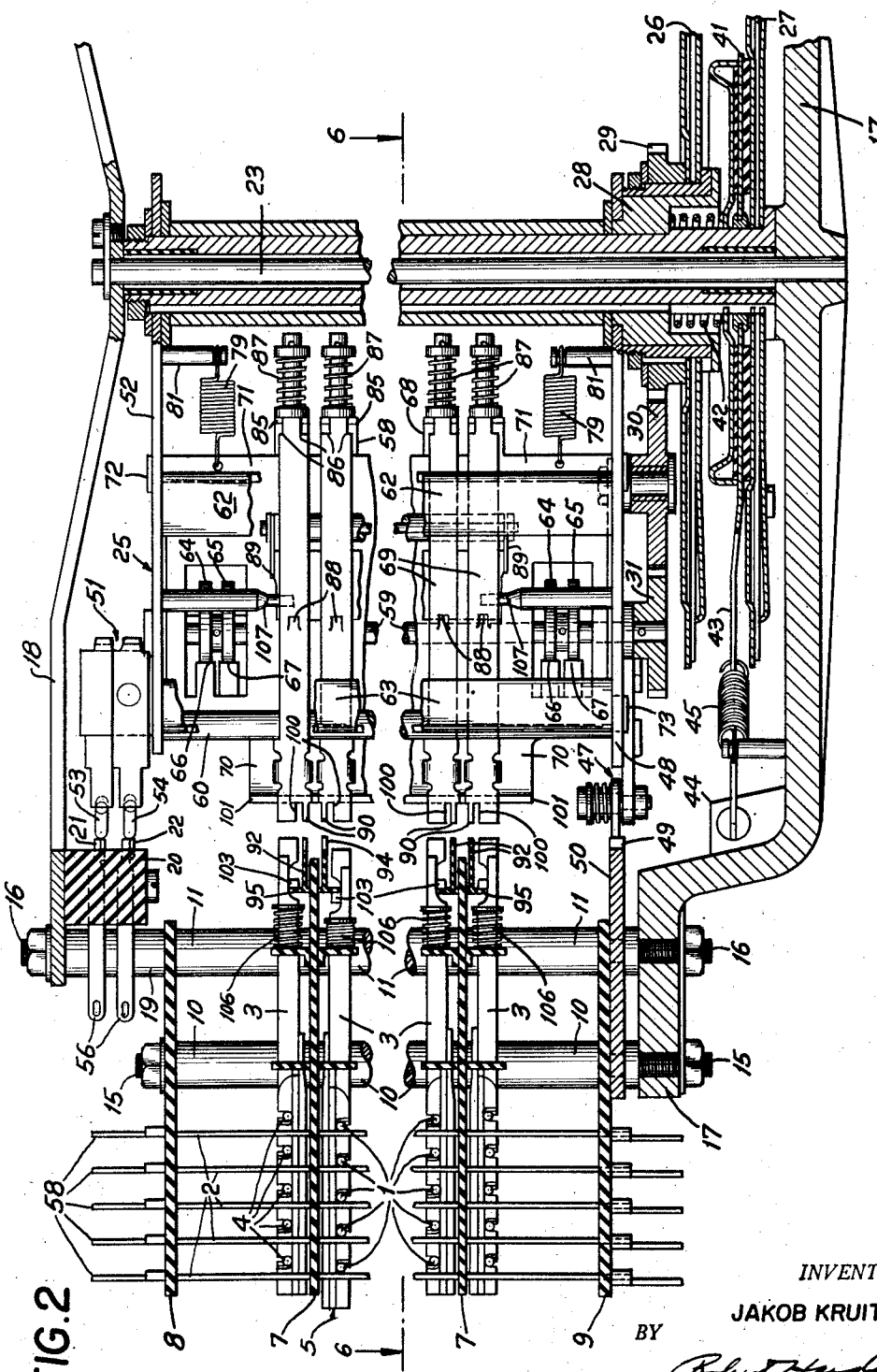

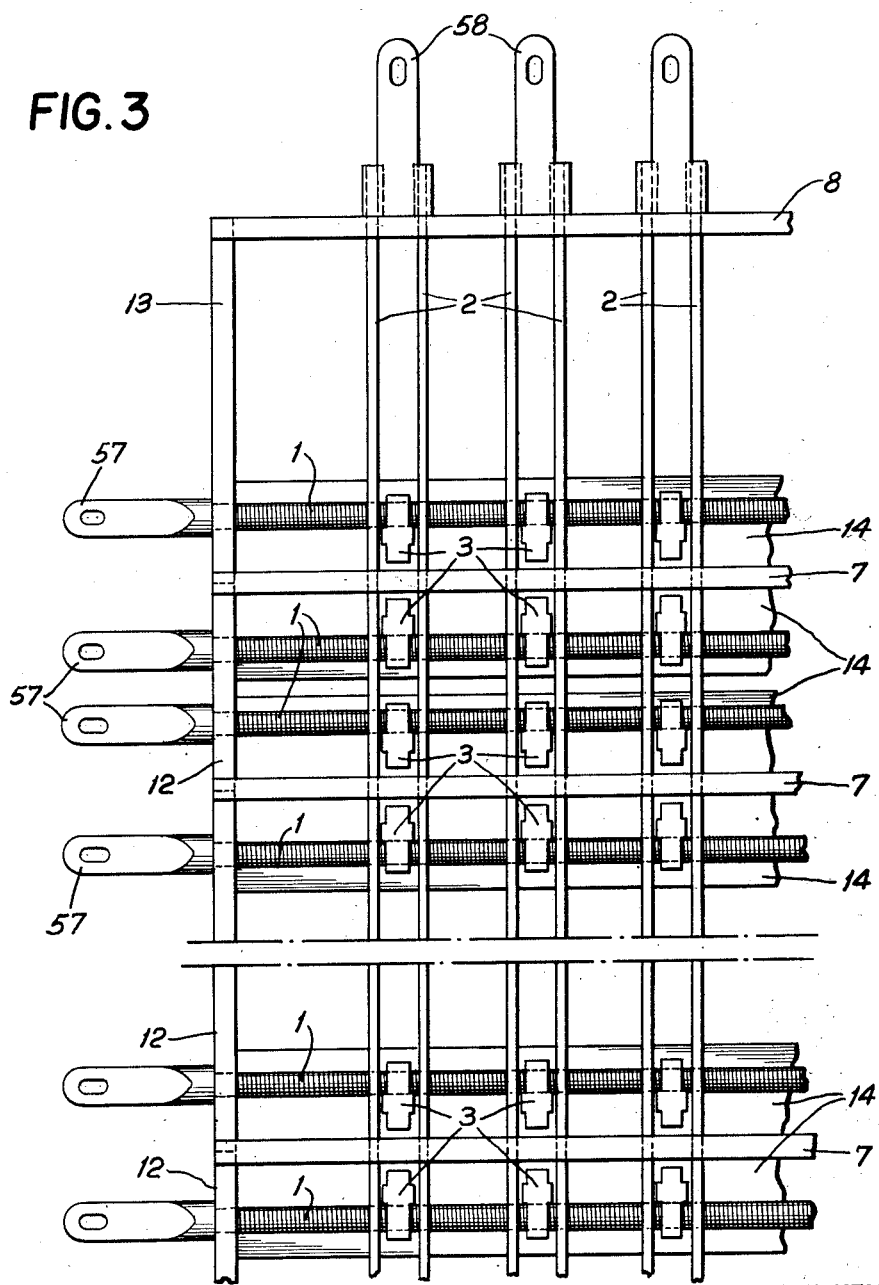

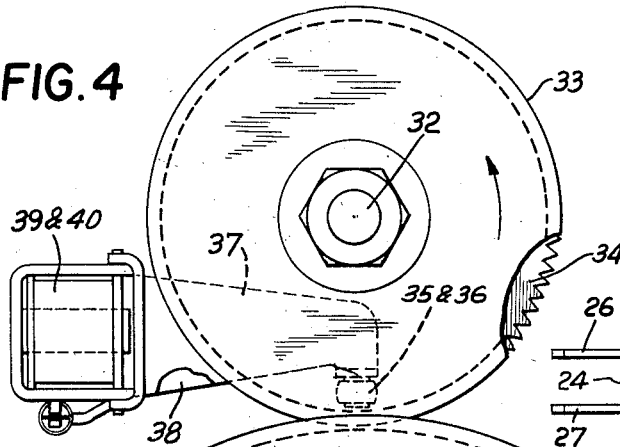
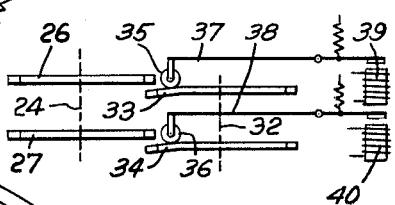
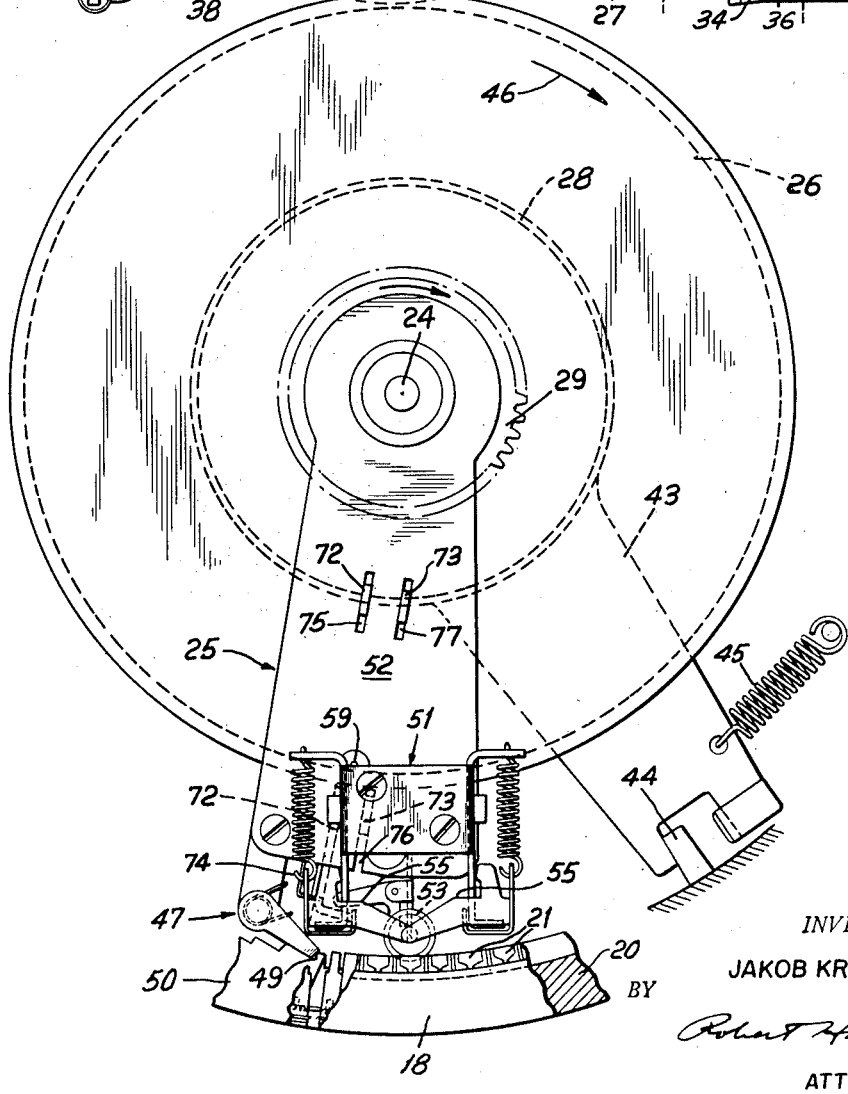

June 2, 1953 J. KRUITHOF 2,640,884
ELECTRIC MULTISWITCH
Filed March 11, 1948 8 Sheets-Sheet 5

INVENTOR.
JAKOB KRUITHOF
BY
*Robert Harding Jr.*
ATTORNEY

INVENTOR.
JAKOB KRUITHOF

INVENTOR.
JAKOB KRUITHOF
BY
ATTORNEY

Patented June 2, 1953

2,640,884

UNITED STATES PATENT OFFICE 2,640,884

ELECTRIC MULTISWITCH

Jakob Kruithof, Antwerp, Belgium, assignor to International Standard Electric Corporation, New York, N. Y., a corporation of Delaware Application March 11, 1948, Serial No. 14,215
In the Netherlands September 12, 1947

10 Claims. (Cl. 179—27.52)

1

The present invention relates to an electric multi-switch. More particularly it relates to a switch in which one or more conductors or one group or kind may be selectively brought into contact with one or more corresponding conductors of a different group or kind.

An object of the invention is to produce a new, efficient and also compact and economical multi-switch which comprises at least one deformable conducting element which may be mechanically moved into engagement with any or a plurality of other crossing conducting elements at their crossing points and produce a good and substantially noiseless electrical contact with substantially no wear on the surfaces of the mutually contacting parts.

Another object of the invention is to produce a multi-switch in which one or more of a plurality of contacts may be made to close and lock by a common moveable member and released by an independent member. Such type of switch may be used for instance as a selector, line finder, register, translator, etc., in an automatic telephone exchange.

In accordance with the invention this multi-switch comprises two kinds of electrical conductors, which kinds are each disposed in one or more parallel flat or curved surfaces that alternately comprise conductors of one kind only, and in which the conductors extend in such directions that between each pair of adjacent surfaces a number of spaced crossing points is provided and the corresponding crossing point in successive pairs of surfaces are aligned and for each group of aligned crossing points a common member for instance a contacting finger is provided, which may simultaneously move the corresponding conductors extending in one direction each towards and against the corresponding conductor extending in the other direction at least one of the kinds of conductors being sufficiently movable to permit bridging the mutual space at one crossing point only and in which further each of said members may be selectively moved in the operative condition, in which the corresponding contacts are closed.

In accordance with another feature of the invention each contacting finger may be locked in its operative position.

Moreover this multiswitch may comprise a number of individual switches, of each of which the inlets are constituted by one set of conductors in one direction (e. g. horizontal) actuated upon by common contacting fingers in a corresponding row or level and of which the sets of conductors in the other direction (e. g. vertical) constitute

2 the multiplied outlets of all individual switches over which they extend.

Furthermore, in accordance with a further feature of the invention, for each individual switch there may be provided a locking member with electro-magnets cooperating with the corresponding row or level of contacting fingers thereof, which member may lock and unlock a contacting finger in the operative position as well as all remaining contacting fingers in their non-operative position.

In common for all individual switches of this multi-switch, a mechanism (e. g. a carriage) may be provided which can select a desired contacting finger in each of the individual switches and can bring this into the operative position.

This common mechanism can occupy each of a number of operative positions, corresponding to the number of outlets provided in common for all individual switches, members (e. g. feeler fingers and pusher fingers) being provided on this mechanism, which in each of the operated positions are positioned in front of the row of contacting fingers corresponding with this outlet.

In accordance with another feature of the invention the common mechanism can cause the selection of the desired contacting finger, by occupying in the first place an operative position, corresponding to the row (e. g. vertical) in which this finger is located, after which the level (which e. g. corresponds to an individual switch), to which this finger belongs, is selected and said members on the common mechanism are operated to move the contacting finger considered.

In accordance with a further feature of the invention the locking member arranged (e. g. as a ring or part of a ring) can be brought into the first operative position whereby the level of contacting fingers is predetermined, one of which has to be brought into the operative position, whilst this member is brought into the second operative position by the common member (e. g. the carriage) after the contacting finger has been moved into the operative position whereby this finger and all remaining fingers of the level are locked in their respective positions under the control of the electro-magnet.

For each level on the common mechanism two members can be provided, one member being a feeler finger and all feeler fingers are moved simultaneously after reaching the operated position, corresponding with the desired level of contacting fingers, in order to predetermine which locking member has been brought into the first operative position, whereupon the other member (e. g. a pusher finger belonging to the feeler member), which found the said locking member, is operated and brings the desired contacting finger into the operative position.

Furthermore, in accordance with another feature of the invention, means, such as cams, can be provided on the common member, which first of all move all the feeler fingers and subsequently displace that pusher finger which corresponds with the feeler finger, indicating that a locking member has been brought into the first operated position, after which these cams restore all feeler fingers and the said pusher finger into the home position.

Each locking member may advantageously have two rows of teeth, one of which cooperates with the feeler fingers on the common mechanism and the other row locks all contacting fingers of the level. The tooth width of that row of teeth cooperating with the feeler fingers and also the distance along which the locking member is moved, may be chosen in such a way that after displacement along a complete tooth width or multiple thereof, the locking member is in the second operative position, whilst the first operative position is reached after a displacement along a half-tooth width or odd multiple thereof and in this position the feeler finger can perform such movement that the corresponding pusher finger is operated.

In accordance with a further feature of the invention, the locking member can be brought into the second operative position, since during the advance of the pusher member, a lever (e. g. a bell crank) coupled with the latter, moves the locking member along the required distance.

In accordance with another feature of the invention the switch comprises a number of stationary contacts or groups of contacts equal to the number of operative positions of the common mechanism whilst on this mechanism, one or more cooperating contacting members have been provided over which one or more electrical circuits can be closed in any of the operative positions.

In accordance with a further feature of the invention, one of the kinds of electrical conductors can be arranged entirely or partly as a helical spring.

Similarly, the contacting fingers can comprise means (e. g. recesses or notches) for directly displacing the movable conductors in the required direction.

Finally, in accordance with another feature of the invention, the contacting fingers can be arranged so, that no electrical contact can be established between the commonly closed crossing points.

These above mentioned and other features and objects of this invention, and the manner of attaining them will become more apparent and the invention itself will be best understood by reference to the following detailed description of an embodiment of the invention taken in connection with the accompanying drawing in which:

Fig. 2 is a vertical section on an enlarged scale taken along line 2—2 of Fig. 1;

Fig. 3 is an enlarged end view of one corner of one sector of the switch taken along line 3—3 in Fig. 1;

Fig. 4 is a detailed plan view of the driving and centering mechanism for the brush carriage;

Fig. 5 is a schematic view showing further details of the driving mechanism for the brush carriage.

Figure 6:
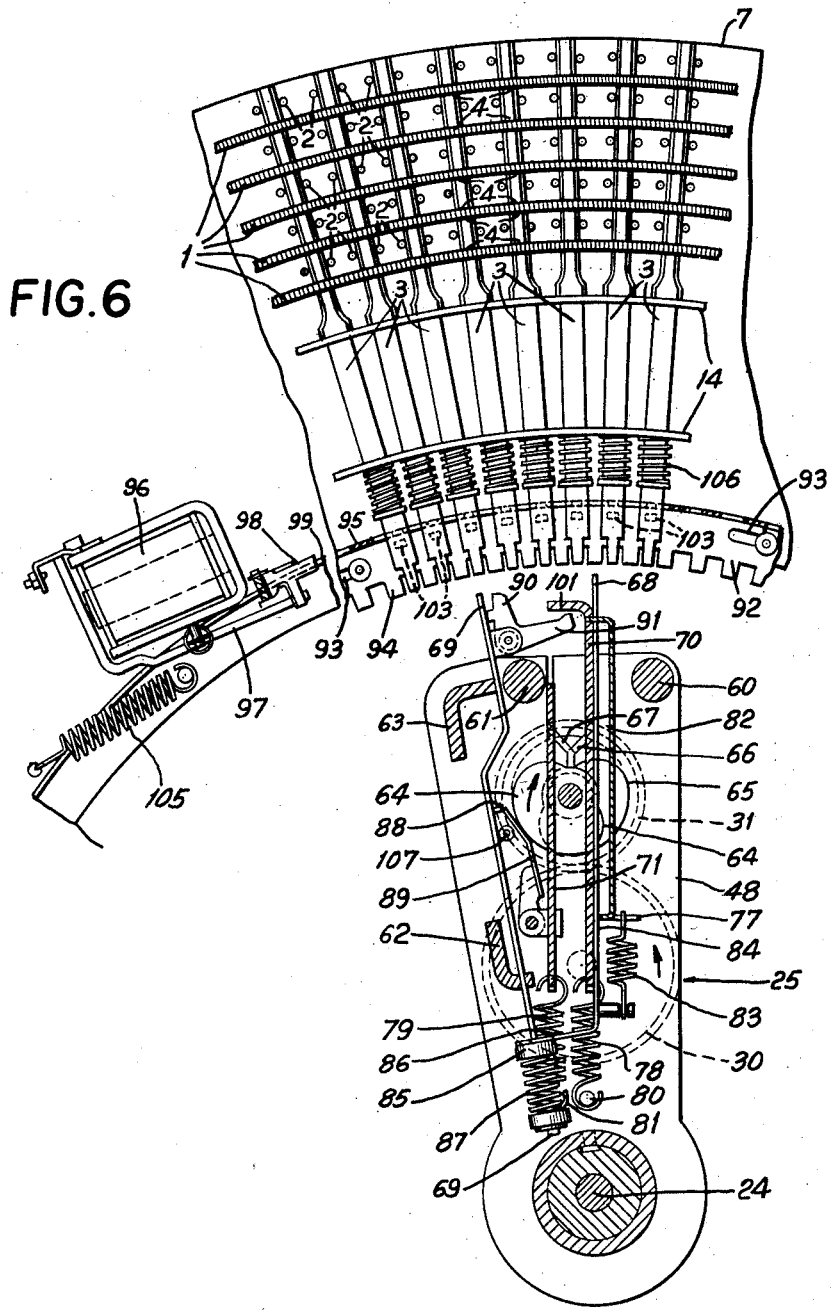
Fig. 6 is a sectional plan view taken along line 5—5 in Fig. 2.
Figure 7:
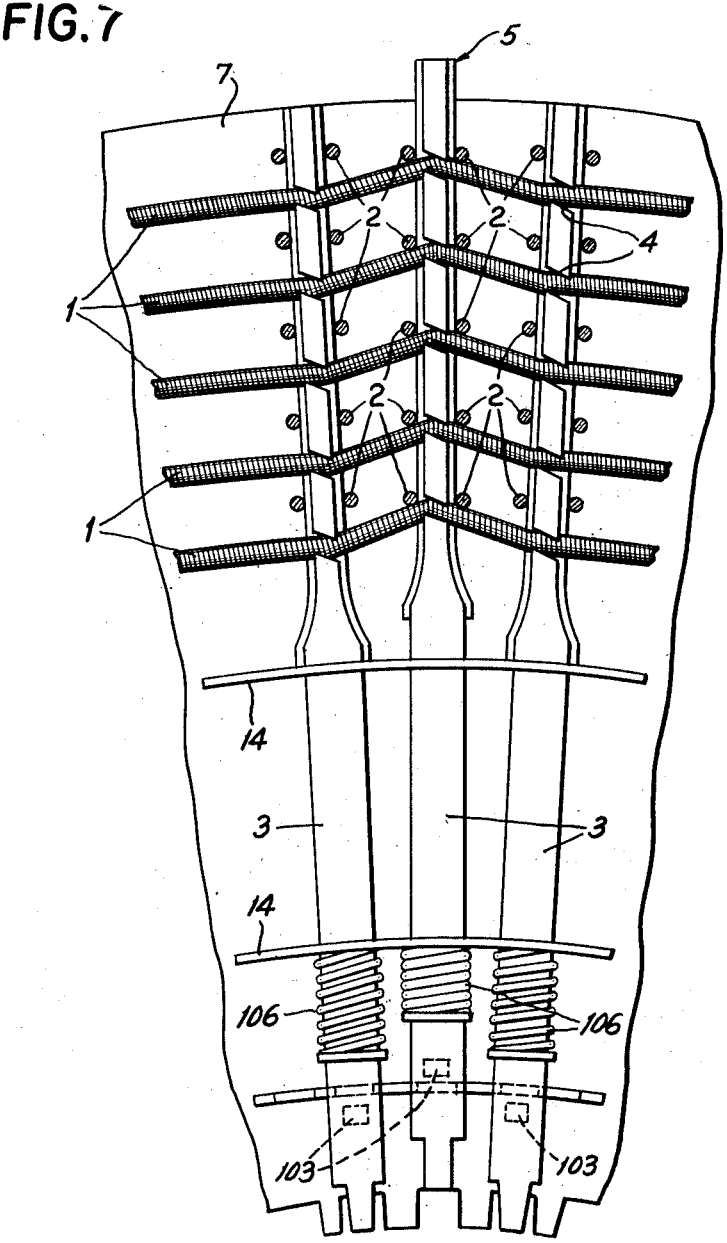
Fig. 7 is a partial sectional view similar to Fig. 5 showing one of the fingers in operated position.

In the accompanying drawings there is shown one embodiment of the multiswitch of this invention adapted for use in an automatic telephone exchange wherein the switch contacts are arranged circumferentially around a rotating brush carriage for making any group of the switch contacts. Referring specifically to the bank of contacts themselves (Figs. 1, 2, 3, 6 and 7) there are shown a plurality of groups or levels of arcuate contacting conductors 1, which are resilient or flexible and are shown to comprise small finely wound wire springs. These contacting conductors are arranged (as shown in Fig. 7) so that they may be pressed against a plurality of vertical contacting bars, rods or conductors 2 (which may be flexible too) arranged in electrically parallel pairs and in groups of five, corresponding to each one of the five flexible conductors 1 in any horizontal level. Thus, the conductors 1 of one group can be said to be arranged in parallel planes spaced at a given minimum distance from the conductors 2 of another group arranged in interleaved parallel planes and each conductor of one group is at an angle to or crosses each conductor of the other. At each spaced crossing of a pair of conductors of each kind there is provided a mechanically slidable finger 3, preferably made of an insulating material and provided with apertures 4 (Figs. 2, 6 and 7) for receiving and holding the flexible conductors 1. These slidable fingers 3 are arranged at right angles to and preferably between the two vertical conductors 2 of each pair, so that when they are pressed outwardly from the center of the assembly herein shown they will press the group of flexible conductors 1 against the corresponding group of pairs of vertical conductors 2, to make contact therewith as shown in Figs. 2 and 7.

Figure 1:
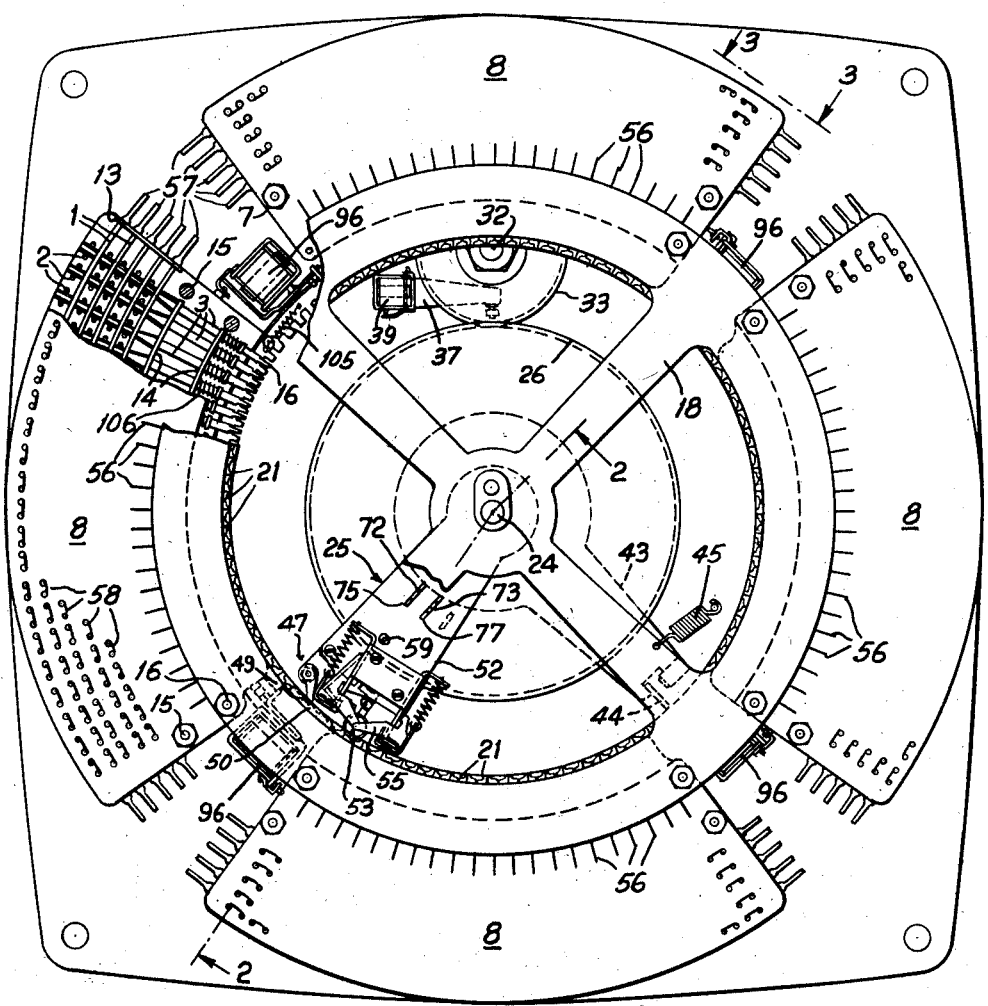
Fig. 1 is a plan view with parts broken away of one embodiment of a rotary type switch of this invention.

The number of conductors in each group, the number of horizontal levels of conductors, the number of radial vertical columns of conductors, and the number of independent contacting fingers 3 may be increased or multiplied from one up to any practical limit. For example, there are shown five electrical connections closed by the operation of each finger 3, each one of each of the connections closing two electrically parallel contacts, that is one contact on each conductor of the pair of conductors 2; and around the arc of the switch, there may be provided about eighty or more different vertical radial columns of pairs of conductors 2 as shown in Fig. 1, and vertically there may be provided for example, forty or more levels of conductors 1.

In the embodiment shown, the parallel planes or surfaces of conductors 1 and 2 including the slidable fingers 3, are mounted in four arcuate sectors each comprising a plurality of intermediate shelves 7 between a top plate 8 and a bottom plate 9. These shelves and plates are preferably made of insulating material and spaced by sleeves 10 and 11 and radially extending edges 12 and 13 of the sectors (see Fig. 3). Mounted on the top and bottom of each shelf 7 are arcuate, vertical walls 14 provided with apertures through which the fingers 3 fit and slide. The sleeves 10 and 11 are held together by long bolts 15 and 16, the lower ends of which are bolted to the lower frame or base 17 of the whole switch assembly, and the upper ends of the bolts 16 are connected to a spider member 18 spaced above the top plate 8 by additional sleeves 19, to provide room for the ring 20 which carries the pairs of contacts or segments 21 and 22 of the brush carriage position-indicating mechanism. Between the center of the base frame 17 and the spider 18 is mounted a fixed axle 24 about which a brush carriage assembly 25 rotates. Two gears 26 and 27 are mounted on the carriage 25, the latter of which rotates the whole brush assembly. The other gear 26 freely rotates on the sleeve 28 of the brush carriage 25 and drives a finger operating mechanism through spur gears 29, 30 and 31. As seen more particularly in Figs. 4 and 5, these gears 26 and 27 may be independently and non-concurrently driven from the common driving shaft 32 on which are mounted two slidably engageable gears 33 and 34 for cooperation with the gears 26 and 27, respectively. These gears 33 and 34 are normally bent out of engagement by suitable rollers 35 and 36 mounted respectively on armatures 37 and 38 of separate clutch magnets 39 and 40. By operating these magnets, the rollers are lifted and the gears 33 and 34 are brought into engagement with gears 26 and 27, respectively under their own tension.

In the operation of the switch, first, magnet 40 is energized and the brush carriage 25 is rotated until proper marked contacts 21 and 22 are engaged. At this time magnet 40 is de-energized and the mechanical centering mechanism (see Figs. 2 and 4) similar to that disclosed in Dutch Patent No. 61,716, September 15, 1948, and British Patent No. 632,220, September 15, 1948, comes into operation. This mechanism comprises a clutch plate 41 held against a clutch surface on the gear 27 by a spring 42. The clutch plate 41 is provided with a lever 43 having a bifurcated end which cooperates with a lug 44 anchored in the base frame 17. This lever is maintained in the position shown in Fig. 4, by means of a strong spring 45. When the clutch has rotated in the direction of the arrow 46, the spring is tensioned so that when the clutch is stopped, it will reverse the rotation of the clutch, causing the pawl mechanism 47 mounted on the base plate 48 of the brush carriage 25 to engage positively one of the centering teeth 49 of the ring 50 stationarily mounted on the frame base 17 by bolts 15 and 16. The teeth of the ring 50 are so arranged with respect to the position of the operating mechanism on the brush carriage and the ends of the fingers 3, that they will be in exact alignment when the pawl mechanism 47 is in engagement with a face 49 of one of the teeth of the ring 50.

The electrical contacts for indicating the radial position at which the carriage is to stop may be controlled by wiper contacts or by a roller type contact assembly 51 (as shown) mounted on the top plate 52 of the brush carriage assembly 25. The roller type contactors 53 and 54 are mounted on spring tension levers 55 and each roller electrically bridges the pairs of contacts 21 and 22, which pairs are mounted in the arcuate non-conducting member 20. The advantages of this type of contact are fully disclosed in Dutch Patent No. 61,737, September 15, 1948. Each of the pairs of contacts 21 and 22 is provided with separate terminals 56 mounted outside the switch assembly above the top plate 8 as shown in Fig. 2. Similar separate terminals 57 and 58 to which conductors or wires may be soldered are provided at each end of each of the conductors 1 and 2, respectively.

After the brush carriage 25 has been centered, the clutch magnet 39 is energized for a sufficient time to cause the shaft 59 of the finger operating and locking mechanism on the brush carriage 25 to make one complete revolution.

This shaft 59 is journalled between plates 48 and 52 of the brush carriage mechanism, which plates are spaced at their outer end by posts 60 and 61 and brackets 62 and 63. Mounted on shaft 59 are two pairs of cams 64 and 65 which cooperate with separate cam followers 66 and 67 (see Fig. 6) for operating feelers and pusher arms or fingers 68 and 69 respectively. These arms are connected with slidable members 70 and 71 having extensions 72 and 73 which are guided in slots 74, 75, 76 and 77 in the top and bottom plates 52 and 48 respectively of the brush carriage mechanism. The cam followers on these members are maintained against the surfaces of their respective cams by springs 78 and 79 anchored to the brush carriage assembly 25 at pins 80 and 81 respectively. There are provided separate arms or fingers 68 and 69 for each horizontal level of fingers 3, while the slidable members 70 and 71 are common to all the levels and extend the full height of the brush carriage between the plates 48 and 52. Each of the feeler fingers 68 is slidably positioned relative to the common member 70 by a common bracket 82 provided with slots through which the fingers 68 may slide (see Fig. 6).

Between each one of the feeler fingers and the common bracket 82 there are mounted springs 83 only sufficiently strong enough to maintain the feeler fingers in their retracted positions so that their shoulders 84 abut against a portion of the bracket 82 attached to the slidable member 70. Each of the fingers 68 is provided with an offset extension 85 which is bifurcated to engage the shoulder 86 at the adjacent end of its corresponding pusher finger 69.

The finger 69 continually urges its shoulder 86 against extension 85 by means of spring 87 mounted on the finger 69. These springs 87 merely maintain the fingers 69 in their normal retracted position with respect to the fingers 68. Each of the fingers 69 is journalled to slide in fixed members 62 and between the column 61 and member 63 which space the top and bottom plates 48 and 52 of the brush carriage 25. One of the fingers 69 of the brush carriage 25 is only selected for operation when its corresponding feeler finger 68 is moved to such an extent that its extension 85 pushes this finger 69 radially outwardly so that the projection 88 on this finger will engage the common pawl 89 mounted on the slidable member 71. Then the operation of the member 71 by the rotation of cam 65 pushes the finger 69 through pawl 89 and projection 88 further outwardly to push in one of the fingers 3 of the switch. A more detailed description of this operation will be described later in connection with Figs. 8 through 12. On the outward end of each finger 69 there is pivoted a bell crank lever 90 maintained in its normal position by a spring 91. When the finger 69 is projected to operate the finger 3, the bell crank lever 90, upon retraction of the slidable member 70 under the action of the spring 78, is caused to move and to operate the toothed locking ring 92 slidably mounted on stationary shelf 7 through slots 93 (see Fig. 6) to lock all the fingers 3 on that level in their operated and unoperated positions. These toothed rings 92 have L-shaped cross-sections and teeth 94 and 95 on each edge thereof. These sets of teeth correspond in number to each of the fingers 3 in that level and are staggered with respect to each other. Each ring 92 is under the control of a separate magnet 96, and to save vertical space the magnets for separate rings may be placed between the conductor frame sectors shown in Fig. 1, so that every fourth vertical ring will be provided with a magnet in the same space between two sectors. The magnets 96 predetermine the proper horizontal level in which the desired finger 3 is to be operated, as the contacts 21 and 22 select the proper vertical row in which that finger 3 is to be operated.

Figure 8:
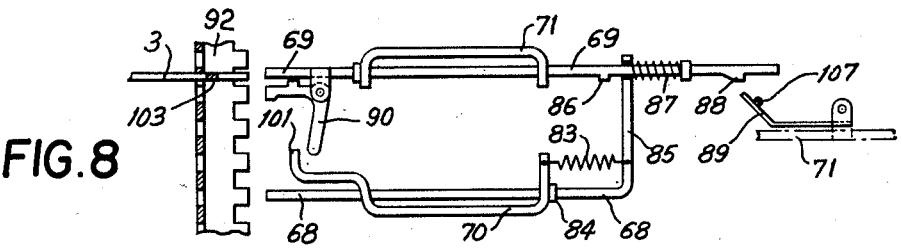
Figs. 8 through 12 are schematic diagrams representing the different operating positions of the finger operating mechanism mounted on the brush carriage.
Figure 9:
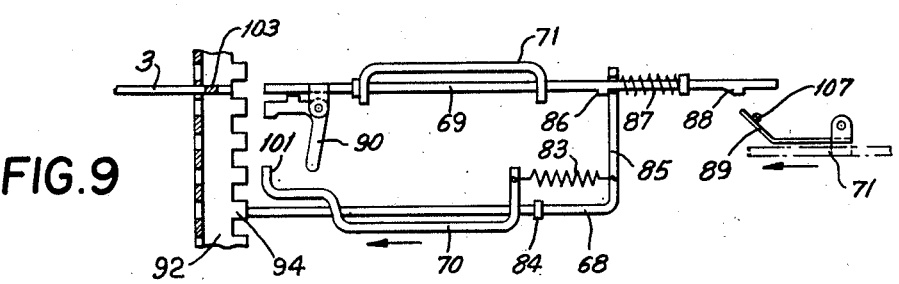
Figure 10:
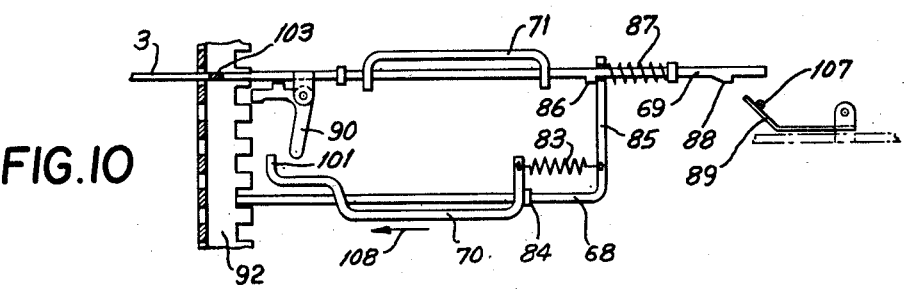
Figure 13:
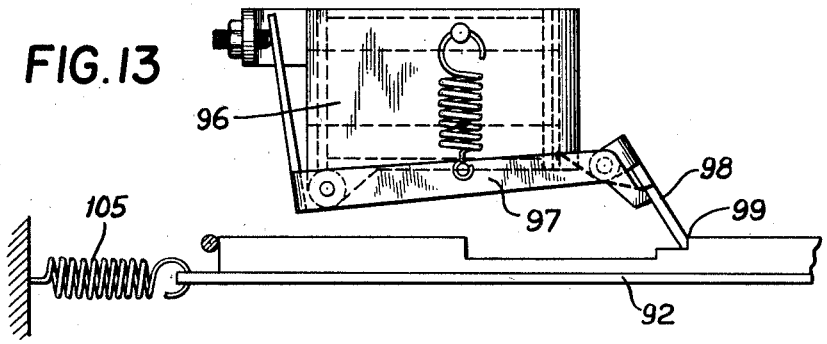
Figs. 13 through 15 are schematic diagrams of the different operating positions of the ring operating magnet of the finger locking mechanism.
Figure 14:
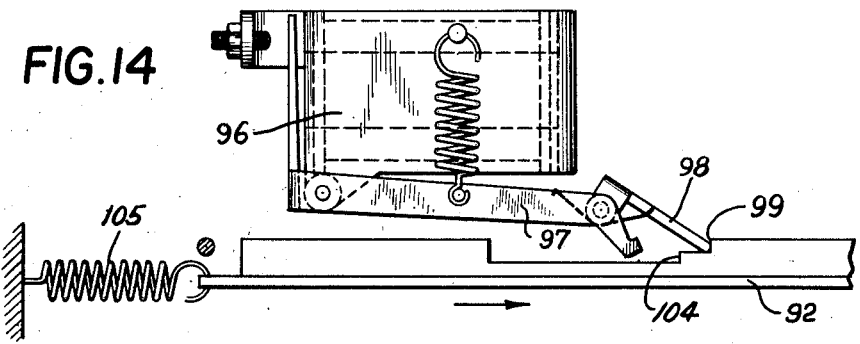

When one of the magnets 96 is energized, it moves its armature 97 carrying spring applied pawl 98, which cooperates with the first notch 99 in the ring 92 (see Fig. 13), to slide or rotate the ring 92 into the positions shown in Figs. 10 and 14. This movement places the feeler fingers 68 in line with an aperture between two adjacent teeth 94 on ring 92 and not in abutment with one of the teeth 94 as shown in Figs. 6, 8 and 9. In this position, the finger 68 is permitted to project by the rotation of cam 64 radially outwardly far enough to also move the pusher finger 69 through extension 85 acting on shoulder 86.

Then the following operation of slidable member 71 will cause the pawl 89 to catch the projection 88 and push the finger 69 further outwardly to move one of the fingers 3 into operated position 5 as shown in Fig. 7. The end of finger 69 is formed so that it will not engage the teeth 94 when it is projected to operate the finger 3, as shown by the cut out portion 100 in Fig. 2. When one of the fingers 3 is in the operated position 5 shown in Fig. 7, flexible conductors 1 are pressed against the vertical pairs of conductors 2 to make good electrical contact between them.

Figure 11:
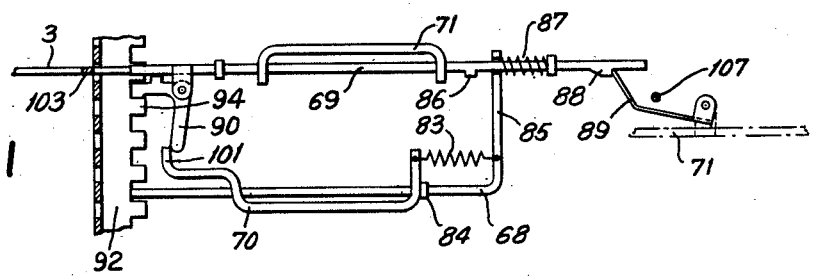
Figure 12:
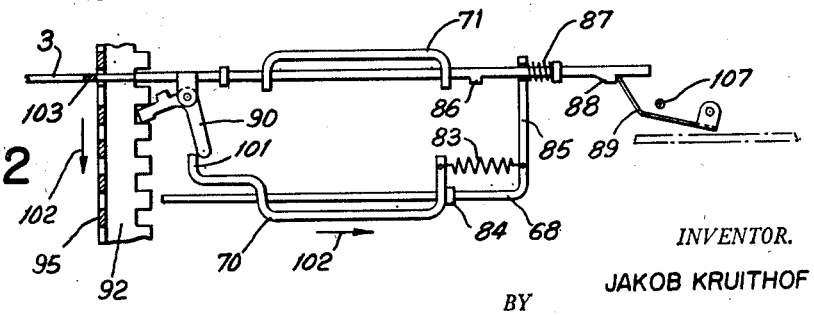
Figure 15:
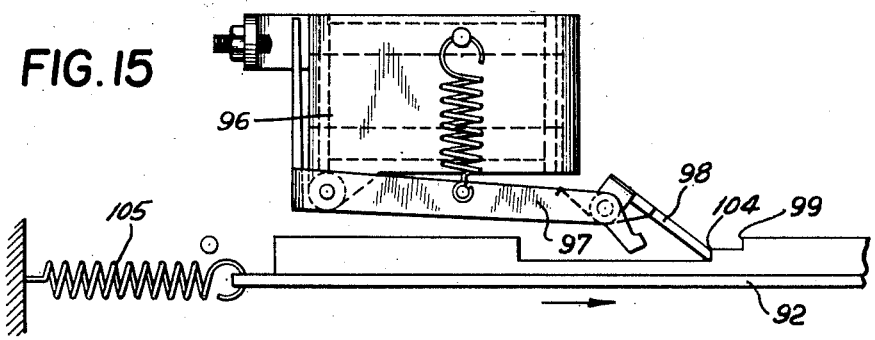

When the finger 69 is projected to operate the finger 3 as shown in Fig. 11, one end of the bell crank lever 90 is projected between two of the teeth 94 so that upon release or retraction of the member 70 the other end of the bell crank lever 90 will engage the projection 101 on member 70 to rotate the bell crank lever, thereby moving the slidable ring 92 in the direction of the arrow 102 into the position shown in Figs. 7 and 12. In this position one of the teeth 95 slides behind in front of the projection 103 of the operated finger 3 to maintain it in operated position, and all the other teeth 95 slide behind each one of the projections 103 on all the other fingers 3 in that level to prevent them from being operated (see Fig. 7). The sliding or rotation of the ring 92 by the action of the bell-crank lever 90, will move the ring into the position shown in Fig. 15 so that the pawl 98 will fall into the second notch 104, and as long as the magnet 96 remains energized the ring will maintain all the fingers 3 in that level in locked position. Thus, when the connection is finished and the magnet 96 for that level is de-energized, the spring 105 connecting each ring to its stationary shelf 7, retracts the ring to disengage the teeth 95 from all the projections 103, so that the operated finger 3 in that row returns to its normal position under the action of its corresponding spring 106.

Referring now more specifically to the schematic Figs. 8 through 12 of the operations of the mechanism shown in Fig. 6, Fig. 8 illustrates the same position as that shown in Fig. 6. Fig. 9 indicates how the feeler finger 68 prevents operation of the pusher finger 69 on those levels which have not been predetermined by operation of the magnet 96. On the other levels the ring 92 will be in the position shown in Fig. 6, so that the end of the fingers 68 will rest against the teeth 94 and further operation of the slidable member 70 will only extend the spring 83 and not cause the arm 85 to engage the projection 86 of finger 69, so that it will be moved far enough forward to have its projection 88 caught by the pawl 89 mounted on slidable member 71. The spring applied pawl 89 which is common to all of the fingers 69 is limited in its outward movement by pegs 107 mounted respectively in the top and bottom plates 52 and 48 of the brush carriage assembly 25.

If, however, the ring 92 has been moved into the position shown in Figs. 10 and 11 by the action of magnet 96, the finger 68 will be permitted to further extend radially outwardly in the direction of arrow 108 so that the extension 85 will engage the projection 86 and move the finger 69 sufficiently far forward to be caught by the pawl 89 which will push the finger 69 into the position shown in Fig. 11 to operate the finger 3 and to project one end of the bell crank member 90 into the space between two adjacent teeth 94 of the ring 92. After this operation the retraction of the member 70, as shown in Fig. 12, engages the other end of the bell crank member 90 to rotate it and slide the ring 92 further in direction of the arrow 102 into its locking position, as described above. After the retraction of the member 70 and finger 68, the spring 79 under control of the cam 65 retracts the slidable member 71 and finger 69 into the initial rest position shown in Fig. 8. Now the whole brush carriage may be rotated into a different position to operate another switch or finger 3 at some other level while the operated switch finger 3 remains operated under the control of magnet 96.

As seen from Figs. 6 through 12, the teeth 94 on rings 92 have two different positions, one wherein the ends of the fingers 3 are exposed, which is the normal or locked position, and the other as shown in Figs. 10 and 11 wherein the ends of the fingers are in alignment with the teeth 94 and the feeler finger 68 may be extended into the space between two adjacent teeth 94.

Although the switch described is a rotary switch providing a rotating brush carriage 25, it is within the scope of this invention to include switches having brush carriages working along a straight line or over a plane surface.

Further, the centering mechanism specifically disclosed may be replaced by other known types of centering mechanism, mechanical or electrical or both, to ensure the alignment of the pusher and feeler fingers with the proper contact operating fingers. Also, instead of the roller type mechanism 51, sliding friction brushes of known type may be employed. The actuating mechanism on the brush carriage for selecting and operating the pusher fingers may be modified to meet any desired requirements. The magnets 96 together with their operated toothed rings 92 may be replaced by other mechanism mechanical or electrical in order to perform the predetermining and locking functions in accordance with the above disclosure.

While there is described above the principles of my invention in connection with specific apparatus, it is to be clearly understood that this description is made only by way of example and not as a limitation to the scope of this invention.

I claim:

1. A selector switch comprising a frame, a plurality of first uniformly spaced resilient conductors disposed in parallel planes on said frame, there being a plurality of said first conductors in each plane, a plurality of second uniformly spaced conductors disposed on said frame and intersecting the planes of the first conductors at points respectively adjacent to said first conductors, a plurality of movable members mounted on said frame, each of said movable members being operative to engage said first resilient conductors of a plane at points adjacent to the intersection points of a respective group of said second conductors, common means movably mounted on said frame, means for selectively positioning said common means adjacent predetermined of said movable members, and driven means on said common means operable to move predetermined of said movable members into engagement with said first resilient conductors for displacing said resilient conductors into contact with a respective group of said second conductors, and means for driving said driven means.

2. A selector switch as claimed in claim 1 wherein each parallel plane of first resilient conductors is positioned to function as an individual switch, said first conductors being connected as incoming conductors for said individual switches and said second conductors being connected as multipled outlets of all individual switches over which they extend, and further comprising means including an electromagnet for each individual switch operative to lock said movable members in an operated position.

3. A selector switch as claimed in claim 2 and wherein said common means is also common to all individual switches of said selector switch and includes means for selecting a desired movable member in each of said individual switches, said common means being successively movable to operating positions corresponding in number to the outlets provided in common for all individual switches.

4. A selector switch as claimed in claim 3 wherein said common means comprises a carriage movably mounted on said frame.

5. A selector switch as claimed in claim 4 wherein said carriage is operative to cause the selection of a desired movable member, said driving means positioning said carriage in an operating position corresponding to a row in which said movable member is located and means on said carriage for selecting a particular movable member in said row.

6. A selector switch comprising a circular frame, a plurality of first resilient conductors mounted in concentric rows on said circular frame, insulating members positioned between a plurality of layers of said concentric rows, a plurality of second conductors mounted axially on said frame in concentric rows, each of said second conductor rows being positioned a given distance from said concentric rows of first conductors and providing crossing points at each layer of said first conductors, a plurality of movable members mounted on said frame and positioned at said crossing points of said first and second conductors, a carriage rotatably mounted on said frame, means for rotating said carriage to selected positions opposite said movable members, driven means mounted on said carriage for engaging a predetermined movable member, means for driving said driven means into engagement with said predetermined movable member, said movable member being operative to displace said first resilient conductors into contact with said second conductors of a predetermined group.

7. A selector switch as claimed in claim 6 wherein each layer of first resilient conductors is arranged to function as an individual switch with said carriage being common to all switches, an electromagnet associated with each of said individual switches, a locking member mounted on each switch having two positions of operation, and means including said electromagnet for moving said locking member to a first of said positions by energizing said electromagnet and to the second of said positions by said carriage after said movable member has been displaced by said driven means, whereby said movable member is locked in an operated position.

8. A selector switch as claimed in claim 7 wherein said carriage is provided with individual driven means for each layer of first resilient conductors and said movable members are individual to each of said layers, said driven means comprising a first member and a second member for each level of said carriage, said driven means including means for moving said first members simultaneously after reaching an operative position in order to determine which locking member has been brought into said first position and said driven means further including means for causing said second member to bring the desired movable member into the operative position.

9. A selector switch as claimed in claim 8 wherein means are provided on said carriage to restore all of said first and second members after said movable members have been moved to an operated position.

10. A selector switch as claimed in claim 6 wherein said first conductors comprise helical springs and said movable members are provided with recesses for directly engaging said helical springs and moving said springs against said second conductors.

JAKOB KRUITHOF.

References Cited in the file of this patent

UNITED STATES PATENTS

| Number | Name | Date |
| --- | --- | --- |
| 1,254,681 | Goodrum | Jan. 29, 1918 |
| 1,307,977 | Keith | June 24, 1919 |
| 1,376,893 | McQuarrie | May 3, 1921 |
| 1,460,913 | Lienzen et al. | July 3, 1923 |
| 1,462,251 | Slough | July 17, 1923 |
| 1,482,625 | Thompson | Feb. 5, 1924 |
| 1,543,825 | Dobbin | June 30, 1925 |
| 2,146,228 | Richter | Feb. 7, 1939 |
| 2,286,328 | Baker | June 16, 1942 |

FOREIGN PATENTS

| Number | Country | Date |
| --- | --- | --- |
| 186,527 | Great Britain | Oct. 5, 1922 |